(No Model.)

G. W. BEYER.
PROCESS OF PRODUCING ARTICLES OF PLASTIC MATERIAL.

No. 447,556. Patented Mar. 3, 1891.

WITNESSES:
C. R. Ferguson
Wm. M. Iliff

INVENTOR
George W. Beyer.
BY Edwin H. Brown
HIS ATTORNEY

UNITED STATES PATENT OFFICE.

GEORGE W. BEYER, OF BROOKLYN, ASSIGNOR TO HIRAM W. HARRIS, OF NEW YORK, N. Y.

PROCESS OF PRODUCING ARTICLES OF PLASTIC MATERIAL.

SPECIFICATION forming part of Letters Patent No. 447,556, dated March 3, 1891.

Application filed October 22, 1890. Serial No. 368,949. (No model.)

*To all whom it may concern:*

Be it known that I, GEORGE W. BEYER, of Brooklyn, Kings county, and State of New York, have invented a certain new and useful Improvement in Processes of Producing Articles of Plastic Material, of which the following is a specification.

My improvement relates particularly to the shaping of plastic material.

Figure 1:
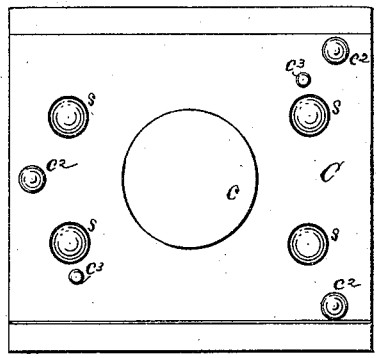
Figure 2:
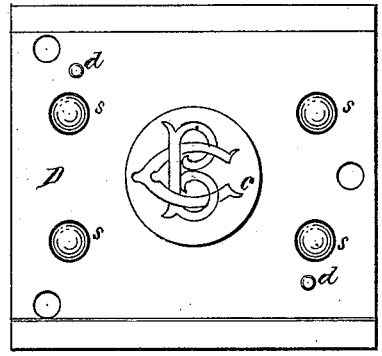
Figure 3:
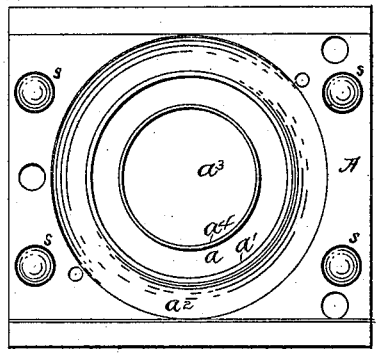
Figure 4:
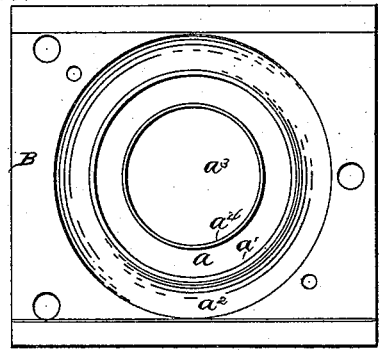
Figure 5:
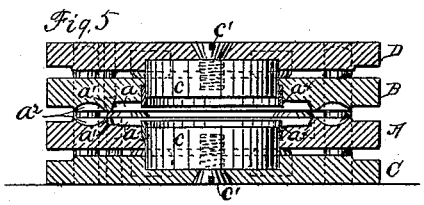
Figure 6:
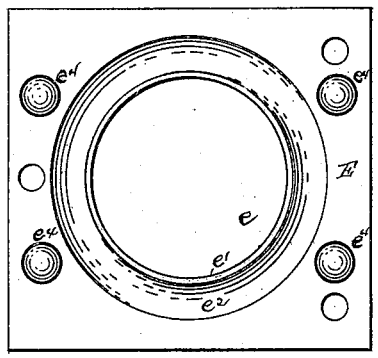
Figure 7:
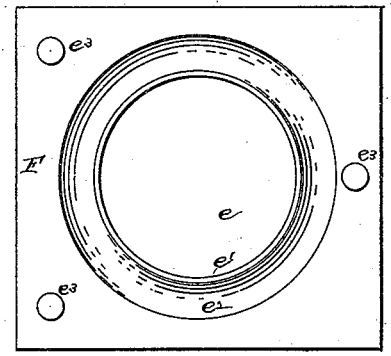

In the accompanying drawings, Figures 1 and 2 are face views of opposite plates of a mold which may be used with my improvement. Figs. 3 and 4 are face views of two other plates which are used in connection with the plates illustrated by Figs. 1 and 2. Fig. 5 is a transverse section with all the plates fitted together. Figs. 6 and 7 are face views of the plates of a finishing-mold.

Similar letters of reference designate corresponding parts in all the figures.

The plates A and B are in the present instance counterparts, although in forming some articles which are to have opposite surfaces of different shapes these plates would differ. As here shown, each of these plates has a central annular cavity $a$, a circular cutting or defining edge $a'$, extending around the outer circumference of the cavity $a$ and bounding the same, and a waste-cavity $a^2$, arranged outside of the cutting or defining edge $a'$. This waste-cavity $a^2$ is here shown as of annular form; but it may be of any other shape. It is obvious that a number of cavities $a$ and cutting or defining edges $a'$ may be formed at intervals in the same plates, so that a number of articles may be molded together, and where this is the case the waste-cavity $a^2$ will be much more extensive and may be shaped differently at the outer edge, so as to enable a strip of plastic material to be spread over a part of the cavities $a$ and cutting or defining edges $a'$ and operated upon by them simultaneously.

At the centers of the plates are circular holes $a^3$, in which hubs extending from plates C and D may be accommodated.

At the inner edge of the cavities $a$ I have shown rings $a^4$. These are not absolutely necessary, but are desirable for reasons which will hereinafter appear. These rings $a^4$ project at the inner edge of the cavities $a$ in the same manner that the cutting or defining edges $a'$ project, but not necessarily to so great an extent. They will preferably be made of steel, and are quite thin or sharp. The plates themselves may advantageously be made of brass. The plates C D have flat faces, but are provided at the center and opposite the holes $a^3$ of the plates A B with cylindrical hubs $c$, which are of a size to fit tightly within the holes $a^3$ or within the rings $a^4$. These hubs are preferably made separately from the plates and attached thereto by means of screws $c'$. The faces of the hubs may be of any suitable shape, and may be plain or engraved to produce different conformations of the plastic material presented to them. They may be readily shaped or engraved, even right up to the circumference. When made separately from the plates C D, additional facility is afforded for shaping or ornamenting them. Their detachable connection with the plates C D is also advantageous, because it enables the user of the mold to substitute hubs of one kind for those of another kind.

I have shown one of the hubs as having a letter delineated upon it. This delineation will be made by sinking the lines into the hub below its top surface.

The plate A is provided with holes, which receive pins $c^2$, extending from the face of the plate C, and it is also provided with holes, which receive pins $c^3$, extending from the plate C. The plate B is provided with holes for receiving pins $d$, extending from the face of the plate D, and it and the plate D are also provided with holes, which receive the pins $c^2$ of the plate C. The pins serve to secure a proper register of the plates.

When it is desired to use my mold, the plate A is placed upon the plate C and plastic material is placed opposite the cavity $a$ and hole $a^3$ of the plates A B. In the hole $a^3$ plastic material of a color different from that in the cavity $a$ may be placed. Obviously a single plate having an operative face corresponding to the faces of the two plates A C would be an equivalent of them. The plates B D are afterward placed above the plastic material and pressed down upon it. Thus the two masses of plastic material will be forced together, so as to be firmly united and both will be shaped. The rings $a^4$ will prevent the plastic material of the two colors from joining on an irregular line at their surfaces and compel them to unite in a circular line. Of course there will be grooves or circular indentations in the finished articles when taken from these plates. Preferably springs will be used between the plates to facilitate their separation. I have shown springs $s$, consisting of india-rubber fitted into cavities in certain of the plates and bearing against adjacent plates. Afterward the pieces of plastic material are subjected to plain molds E F, and in this way the grooves will be removed and the surfaces of the articles made true and polished. These molds E F, it will be seen, have cylindric cavities $e$, cutting or defining edges $e'$ around these cavities, and waste-cavities $e^2$ outside of the cutting or defining edges. One of these plates has pins $e^3$ entering holes in the opposite plate to cause a proper register of the two plates, and one of the plates has springs $e^4$, which will bear against the opposite plate and facilitate the separation of the two plates. The mold-plates may be heated in the usual or any suitable manner prior to being used.

Instead of placing two differently-colored plastic materials between the plates A B, a plastic material of uniform color may be introduced, and then sheets of plastic material or of any other material—such, for instance, as paper—may be laid within the holes $a^3$, so as to be forced into the mass of plastic material when the plates are pressed together. When this is to be done, the rings $a^4$ may be dispensed with, although they will still be useful for centering the piece of material to be attached to the plastic material.

When the faces of the hubs are ornamented by sinking lines into them, ridges or raised lines will of course be formed on the plastic material. These ridges may be colored differently from the plastic material on which they are formed if coloring material is inserted in the lines sunk into the faces of the hubs. The ridges formed by the lines sunk in the faces of the hubs will of course be flattened out by the finishing-molds, but the coloring will remain.

Obviously it will be usually preferable to place both the top plates B D separately above the plastic material; but they may be applied together.

What I claim as my invention, and desire to secure by Letters Patent, is—

1. The process of producing articles of plastic material with different colors, consisting in placing an unformed mass of plastic material in a mold, placing a differently-colored material in the mold adjacent to part of said mass of plastic material, subjecting the materials together to pressure, so as to unite them and shape the plastic material, and afterward subjecting the materials to a finishing-mold, substantially as specified.

2. The process of ornamenting articles of plastic material, consisting in placing plastic material in a mold having a design formed in it by sinking lines into its surface, placing coloring material in the sunken lines of the mold, subjecting the plastic material to pressure, so as to form colored ridges, and afterward subjecting the material to pressure in a smooth finishing-mold for smoothing out the colored ridges, but leaving the lines of colored material, substantially as specified.

In testimony whereof I have signed my name to this specification in the presence of two subscribing witnesses.

GEORGE W. BEYER.

Witnesses:
 DANIEL G. JOSEPH,
 AUGUSTUS J. THORNE.